(12) United States Patent
Freilikhman et al.

(10) Patent No.: US 12,505,129 B2
(45) Date of Patent: Dec. 23, 2025

(54) DISTRIBUTED DATABASE SYSTEM

(71) Applicant: DRIVENETS LTD., Raanana (IL)

(72) Inventors: Gregory Freilikhman, Or Akiva (IL); Oren Hecht, Ra'anana (IL); Ido Koren, Holon (IL); Gal Rotenberg, Ramat Gan (IL); Amit Lasry, Gan Yavne (IL)

(73) Assignee: DRIVENETS LTD., Raanana (IL)

( * ) Notice: Subject to any disclaimer, the term of this patent is extended or adjusted under 35 U.S.C. 154(b) by 4 days.

(21) Appl. No.: 17/574,001

(22) Filed: Jan. 12, 2022

(65) Prior Publication Data

US 2022/0229857 A1    Jul. 21, 2022

Related U.S. Application Data

(60) Provisional application No. 63/137,750, filed on Jan. 15, 2021.

(51) Int. Cl.
*G06F 16/28* (2019.01)
*G06F 16/21* (2019.01)
*G06F 16/25* (2019.01)

(52) U.S. Cl.
CPC ............ *G06F 16/289* (2019.01); *G06F 16/21* (2019.01); *G06F 16/252* (2019.01)

(58) Field of Classification Search
CPC ...... G06F 16/289; G06F 16/21; G06F 16/252; G06F 16/2228; G06F 16/27; G06F 11/1448; C07H 21/00
See application file for complete search history.

(56) References Cited

U.S. PATENT DOCUMENTS

| | | | | |
|---|---|---|---|---|
| 9,971,526 | B1* | 5/2018 | Wei | G06F 3/064 |
| 10,621,156 | B1* | 4/2020 | Morkel | G06F 16/2393 |
| 2012/0151200 | A1* | 6/2012 | Beachem | H04L 9/0894 |
| | | | | 713/168 |
| 2013/0282797 | A1* | 10/2013 | Carls | H04L 67/10 |
| | | | | 709/203 |
| 2014/0019934 | A1* | 1/2014 | Schlarb | G06F 8/72 |
| | | | | 717/104 |
| 2015/0220584 | A1* | 8/2015 | Isaacson | G06F 16/2453 |
| | | | | 707/715 |
| 2017/0103116 | A1* | 4/2017 | Hu | G06F 16/217 |
| 2019/0286839 | A1* | 9/2019 | Mutha | G06F 21/604 |
| 2020/0034351 | A1* | 1/2020 | Matsugatani | G05D 1/0088 |
| 2020/0327140 | A1* | 10/2020 | Khillar | G06F 16/2282 |
| 2020/0412797 | A1 | 12/2020 | Devireddy et al. | |

* cited by examiner

*Primary Examiner* — Albert M Phillips, III
*Assistant Examiner* — Fernando M Mari Valcarcel
(74) *Attorney, Agent, or Firm* — FisherBroyles, LLP; Roger L. Browdy; Ronni S. Jillions

(57) ABSTRACT

A distributed data storage system is provided. The system comprises: a database server adapted to store key values associated with a plurality of data types; and a plurality of client platforms, each adapted to store data of at least one data type and to store indexing information, and wherein each of the plurality of client platforms is configured to implement compilation of its respective data scheme by a database logic compiler (DBLC) into an object relational mapping (ORM), to enable obtaining a static part of that respective client platform.

5 Claims, 1 Drawing Sheet

DISTRIBUTED DATABASE SYSTEM

TECHNICAL FIELD

The present disclosure generally relates to the field of databases. More specifically, it relates to where the logic of the database resides.

Glossary

BST—Binary Search Tree.
CPU—Central Processing Unit.
CSDD—Client-Side Distributed Database.
DBLC—Database Logic Compiler.
ORM—Object Relational Mapping.
TTL—Time To Live.

BACKGROUND

In the field of databases, the common approach in the art is that servers are heavy monolithic devices. The servers are "smart" and maintain all the required logic, for example, indexing, scheme enforcement, complex querying (joins), periodic cleanup routines, shards, replications, and the like, while client entities are thin (i.e., they do not comprise too much logic, or in other words, entities which are relatively "dumb" entities).

Such implementations entail a number of difficulties:
a. The server must be redeployed when each new feature is introduced thereat, and sometimes also client entities need to be updated.
b. Although a client entity may use a subset of the server's features, still, its performance might deteriorate if a substantial number of client entities use the same code path. This difficulty will intensify in time, along with the addition on new features to the server.
c. Because client entities are thin entities, they usually do not have a fine-grained control over the executed queries. Consequently, a client entity would not be able to update an entry within the database without updating the index, for example.

A number of conventional database systems exist that implement large and scalable database architectures. A variety of database architectures can be selected and tailored to specific data requirements. However, as the number of systems that support the various architectures increase, the complexity of the database system likewise increases. In some cases, management of the database system becomes as complex as the architecture itself, and can overwhelm administrators who need to make changes on large databases.

In an attempt to solve at least some of this complexity, U.S. Pat. No. 10,713,280 discloses a cloud distributed database that comprises a cloud-based resource, a database subsystem executing on the cloud-based resource, a proxy layer configured to control authentication of client systems based on connection strings communicated from the client systems connecting to the cloud resources. The publication discloses a database as a cloud service that eliminates the design challenges associated with many distributed database implementations, while allowing the client's input on configuration choices in building the database. Also, clients may identity a number of database nodes, capability of the nodes, and within minutes have a fully functioning, scalable, replicated, and secure distributed database in the cloud.

US20130290249 describes systems and methods for managing asynchronous replication in a distributed database environment, while providing for scaling of the distributed database. By the solution described in this publication, a cluster of nodes is assigned with roles for managing partitions of data within the database and processing database requests. Each cluster may include a node with a primary role to process write operations and mange asynchronous replication of the operations to at least one secondary node. Each cluster or set of nodes can host one or more partitions of database data. Collectively, the cluster or set of nodes define a shard cluster that hosts all the data of the distributed database. Each shard cluster, individual nodes, or sets of nodes can be configured to manage the size of any hosted partitions, splitting database partitions, migrating partitions, and/or managing expansion of shard clusters to encompass new systems.

The present disclosure provides a new solution that provides a high performance, agile database system.

SUMMARY

The disclosure may be summarized by referring to the appended claims.

It is an object of the present disclosure to provide a novel storage system that comprises a thin, high performance database server.

It is another object of the present disclosure to provide a novel storage system that comprises a new DBLC logic configured to compile data scheme to the low-level server operations, with precompiled data such as shard ID.

It is another object of the present disclosure to provide a novel storage system wherein the main logic of the system resides at the client side.

It is another object of the present disclosure to provide a novel storage system wherein clients are configured to implement only features which are currently needed to be carried out.

Other objects of the present disclosure will become apparent from the following description.

According to a first embodiment of the present disclosure there is provided a distributed data storage system comprising:
  a database server adapted to store key values associated with data being data that belong to a plurality of data types; and
  wherein said distributed data storage system is characterized by having a plurality of client platforms, each adapted to store data of at least one data type and to store indexing information, and wherein each of the plurality of client platforms is configured to implement compilation of its respective data scheme by a database logic compiler (DBLC) into an object relational mapping (ORM), to enable obtaining a static part of that respective client platform.

In other words, the proposed system comprises a database server that provides a set of low level, very high-performance operations while enabling the use of different data types.

Because the querying and database logic is implemented close to the data source (i.e., at the client side), optimizations that would otherwise be impossible in current implementations known in the art, become possible. Thereby, allowing higher end-to-end performance and agile feature development without performance degradation over time.

According to another embodiment, the at least one data type is a member of a group that consists of: a hash map, a sorted set, a list, a binary search tree (BST), and the like.

In accordance with another embodiment, the data scheme comprises information that relates to at least one of: data types, data relations, if and how data should be indexed, and other applicable metadata.

These data types are used by client platforms to implement both data storing (using the appropriate data type) and indexing. This is analogous to a CPU and compilers: the CPU (analogous to the database server) provides basic operations, while the compilers (which are analogous to client platforms) are configured to compile complex application logic for those low-level operations.

In addition, runtime flags may enable additional flexibility to enforce non-indexed data stores, or query data directly without having to check the index (e.g., if the exact key of the data entry is known).

By yet another embodiment, the database logic compiler (DBLC) is configured to calculate a shard ID for each data entry during compilation.

According to still another embodiment, all related data entries are stored on a single shard, while unrelated data may be stored on a different shard.

Implementing this embodiment, allows simple horizontal and vertical expansion (an instance wherein the database server is spanned at the same host to obtain horizontal growth, and to another server to obtain a vertical expansion).

In accordance with yet another embodiment, periodic functions that are required to maintain the database server are implemented by an additional computing platform.

Preferably, the periodic functions required to maintain the database server such as, for example, cleanups, or any other periodic function are implemented by an additional computing platform (i.e., one which operates as another client not included in the database server), to maintain the database server as thin and as fast as possible.

BRIEF DESCRIPTION OF DRAWINGS

The accompanying drawings, which are incorporated herein and constitute a part of this specification, illustrate several embodiments of the disclosure and, together with the description, serve to explain the principles of the embodiments disclosed herein.

DESCRIPTION OF EXEMPLARY EMBODIMENTS

Some of the specific details and values in the following detailed description refer to certain examples of the disclosure. However, this description is provided only by way of example and is not intended to limit the scope of the invention in any way. As will be appreciated by those skilled in the art, the claimed system may be implemented by using other methods that are known in the art per se. In addition, the described embodiments comprise different steps that are carried out, not all of which are required in all embodiments of the invention. The scope of the invention can be summarized by referring to the appended claims.

One of the underlying principles of the present disclosure is that distributed database storage system comprises a thin, high performance database server that enables a set of low level, very high-performance operations, therefore since the querying and database logic is implemented at the client side, it becomes possible to optimize operations that need to be carried out.

Figure 1:
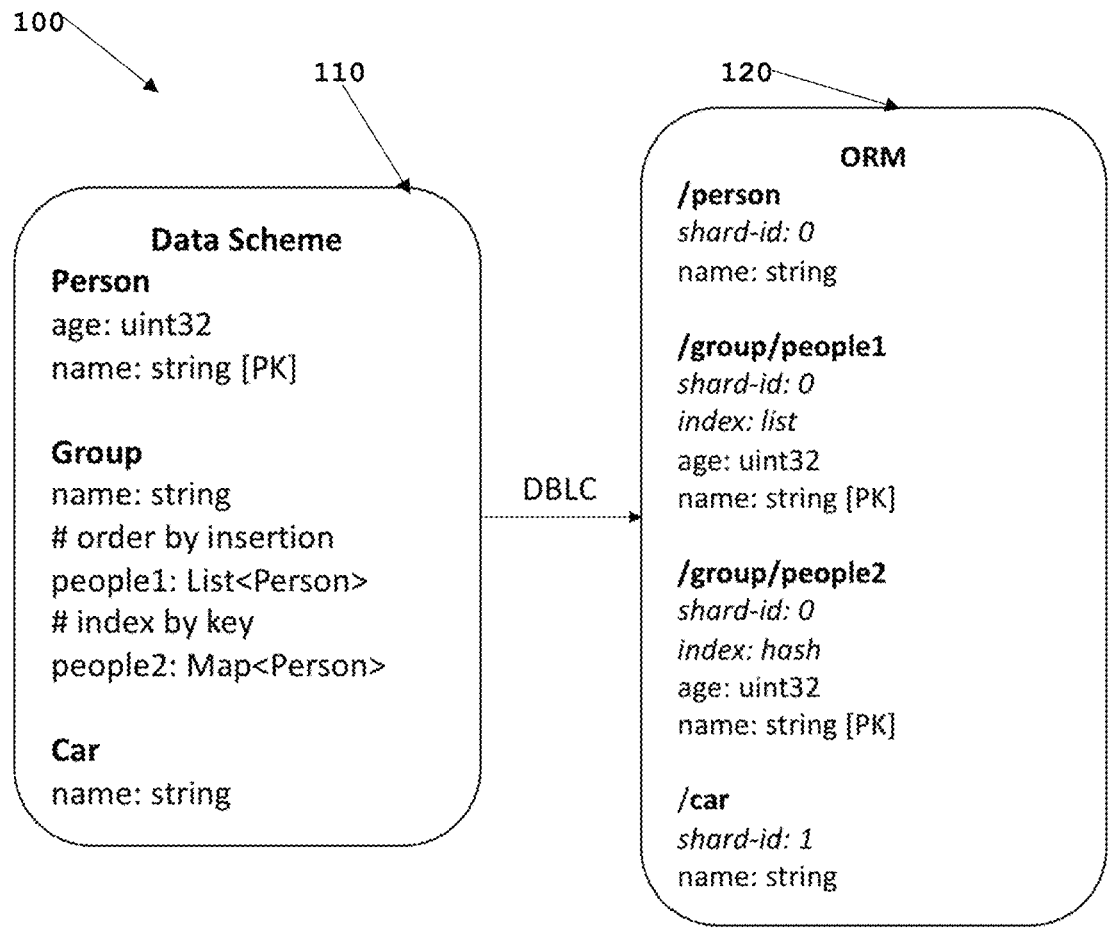
FIG. 1 illustrates an example of a DBLC compilation construed in accordance with an embodiment of the present invention.

FIG. 1 illustrates an example of a DBLC compilation in accordance with an embodiment of the present invention. According to this example, a client platform (not shown in this figure) is configured to implement compilation of its respective data scheme (100) by a database logic compiler (DBLC) (110) into an object relational mapping (ORM) (120), to enable obtaining a static part of that respective client platform. As may be seen in this figure, the right indexes are selected for the data-model. It should be noted that the entity "car" is provided with a different shard ID, 1, than the shard ID, 0, of the "group" entity or the "person" entity included at the same ORM (120). By using the present invention, it becomes possible to implement this option because the different shard may be used in the data scheme, independently. This compile time decision allows to send data to the right shard in the cluster directly from the client, as opposed to common implementations in which shard ID is computed at runtime and then the data is redirected to the right shard in the cluster. The example serves to demonstrate how compile time decisions/optimizations may be affected in order to improve performance.

Figure 2:
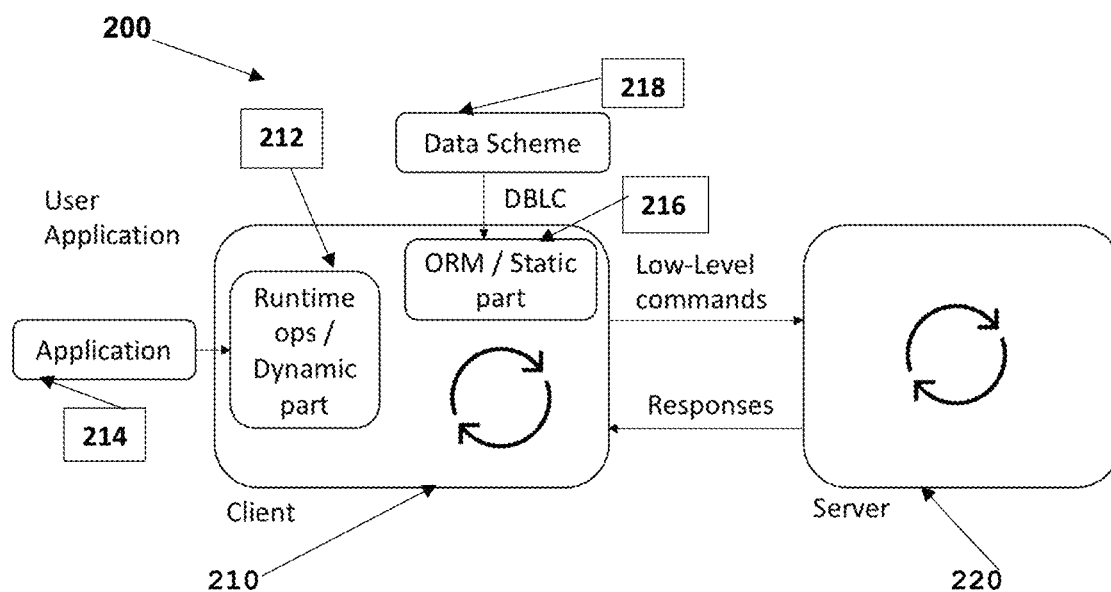
FIG. 2 demonstrates an example of a distributed data storage system construed in accordance with an embodiment of the present invention.

FIG. 2 demonstrates an example of a distributed data storage system (200) construed in accordance with an embodiment of the present invention, presenting among others the static and dynamic parts thereof.

Distributed data storage system (200) shown in this example comprises a client platform (210) (other client platforms are not shown in this figure) and a thin database server (220).

Client platform (210) comprises two main parts, a dynamic part (212) at which runtime operations are carried out base on information received from user application (214). The other main part is a static part, ORM (216), which is based on information received from a corresponding data scheme (218). The system operates by conveying low-level commands from client platform (210) to database server (220) and receiving the respective responses from that server.

Now, let us consider an example where a client creates a "Person" entity (see FIG. 1) with the name "Alice". The following procedure may be implemented. First "Alice" will be added to index "/person", and then "Alice" Person entity will be added to key-value storage. These low-level instructions are generated using the static part. However, a client may add a flag so that only adding of a Person entity to the key-value storage, will be affected without manipulating the index. Preferably, this is done if the client is sure that the index has already been created, and data only needs to be updated. Adopting such a method is effective in improving performance quite dramatically.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A distributed data storage system comprising:
a database server storing key values, each indicating a respective data type selected from among a plurality of data types, being members of a group that consists of: a hash map, a sorted set, a list, a binary search tree (BST), and wherein said database server is configured to carry out high-performance operations based on low-level commands received from a plurality of client platforms; and wherein said distributed data storage system is characterized in that: a) the distributed data storage system's main logic resides at said plurality of client platforms; b) the plurality of client platforms is configured to implement features which are currently needed to be carried out; and c) each of said plurality of client platforms stores data of at least one data type from among said plurality of data types and stores indexing information, and wherein each of the plurality of client platforms is configured to compile by a database logic compiler (DBLC) its own respective data scheme which comprises information that relates to at least the respective data type, into an object relational mapping (ORM) while using information related to said respective data type and derived from said data scheme, thereby obtaining a static part of that respective client platform, wherein said static part of the respective client platform is used for generating low-level commands which are conveyed from the respective client platform to said database server, thus enabling high-performance operations to be carried out by said database server, and wherein information comprised in the client platform's respective data scheme that relates to a data type, is used by the respective client platform to implement both data storing, using that data type, and indexing.

2. The distributed data storage system of claim 1, wherein the data scheme comprises information that relates to at least one of: data types, data relations, if and how data should be indexed.

3. The distributed data storage system of claim 2, wherein all related data entries used for obtaining a static part of a respective client platform are sent directly from said client platform to a right shard in the cluster and stored on a single shard, while unrelated data, which are not used for obtaining a static part of that respective client platform, are sent directly from the client platform to a different shard in the cluster, and stored thereat, thereby enabling to compile a data scheme to the low-level server operations, with pre-compiled data.

4. The distributed data storage system of claim 1, wherein the database logic compiler (DBLC) is configured to calculate a shard ID for each data entry during compilation, in order to allow sending data to the right shard in the cluster, directly from the client.

5. The distributed data storage system of claim 1, wherein periodic functions required to maintain the database server are executed by an additional computing platform.

* * * * *